United States Patent
Seok (10) Patent No.: US 9,066,283 B2
(45) Date of Patent: Jun. 23, 2015

(54) PROCEDURE FOR BASIC SERVICE SET (BSS) LOAD MANAGEMENT IN WLAN SYSTEM

(75) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 151 days.

(21) Appl. No.: 13/141,292

(22) PCT Filed: Dec. 21, 2009

(86) PCT No.: PCT/KR2009/007641
§ 371 (c)(1),
(2), (4) Date: Jun. 21, 2011

(87) PCT Pub. No.: WO2010/074471
PCT Pub. Date: Jul. 1, 2010

(65) Prior Publication Data
US 2011/0255401 A1    Oct. 20, 2011

(30) Foreign Application Priority Data
Dec. 22, 2008  (KR) .................. 10-2008-0131172

(51) Int. Cl.
*H04W 74/08*  (2009.01)
*H04W 48/20*  (2009.01)
*H04W 36/22*  (2009.01)

(52) U.S. Cl.
CPC ............. *H04W 48/20* (2013.01); *H04W 74/08* (2013.01); *H04W 36/22* (2013.01)

(58) Field of Classification Search
CPC .................................................. H04W 74/08
See application file for complete search history.

(56) References Cited

U.S. PATENT DOCUMENTS

| | | | |
|---|---|---|---|
| 7,236,782 B2 * | 6/2007 | Utsunomiya et al. | 455/434 |
| 7,315,524 B2 * | 1/2008 | Ohmi et al. | 370/322 |
| 7,522,552 B2 * | 4/2009 | Fein et al. | 370/328 |
| 7,570,656 B2 * | 8/2009 | Raphaeli et al. | 370/445 |
| 7,701,962 B2 * | 4/2010 | Utsunomiya et al. | 370/445 |
| 7,839,819 B2 * | 11/2010 | Kim | 370/329 |
| 7,903,607 B2 * | 3/2011 | Utsunomiya et al. | 370/329 |
| 7,907,582 B2 * | 3/2011 | Du et al. | 370/338 |
| 7,944,882 B2 * | 5/2011 | Stephens | 370/330 |
| 7,957,346 B2 * | 6/2011 | Nabetani | 370/329 |
| 7,974,243 B2 * | 7/2011 | Nagata et al. | 370/334 |
| 7,983,298 B2 * | 7/2011 | Nanda et al. | 370/468 |
| 8,005,055 B2 * | 8/2011 | Kwak et al. | 370/338 |
| 8,019,303 B2 * | 9/2011 | Liu et al. | 455/277.1 |
| 8,068,455 B2 * | 11/2011 | Utsunomiya et al. | 370/329 |

(Continued)

FOREIGN PATENT DOCUMENTS

| | | |
|---|---|---|
| CN | 1720756 A | 1/2006 |
| WO | 2004/057899 A1 | 7/2004 |

*Primary Examiner* — Gregory Sefcheck
(74) *Attorney, Agent, or Firm* — Birch, Stewart, Kolasch & Birch, LLP (57) ABSTRACT

Provided are a basic service set (BSS) load management procedure and a quiet interval setup procedure in a wireless local area network (WLAN) system. The WLAN system uses a bonding channel, and an access point (AP) of the WLAN system provides BSS load information regarding a channel having a bandwidth less than or equal to a bandwidth of the bonding channel (e.g., each of channels of 20 MHz, 40 MHz, 60 MHz, and 80 MHz) to STAs of the WLAN system. The BSS load information may be specified by an extended BSS load element. The AP transmits the extended BSS load element to the STAs by including the BSS load information to a beacon frame or a probe response frame.

11 Claims, 4 Drawing Sheets

| Element ID | Length | Quiet Count | Quiet Period | Quiet Duration | Quiet Offset |
|---|---|---|---|---|---|
| Octets: 1 | 1 | 1 | 1 | 2 | 2 |

(56) References Cited

U.S. PATENT DOCUMENTS

| | | | |
|---|---|---|---|
| 8,107,404 B2* | 1/2012 | Utsunomiya et al. | 370/278 |
| 8,175,661 B2* | 5/2012 | Park et al. | 455/574 |
| 8,229,439 B2* | 7/2012 | Du | 455/438 |
| 8,238,298 B2* | 8/2012 | Zhao et al. | 370/329 |
| 8,284,746 B2* | 10/2012 | Tokuyasu et al. | 370/338 |
| 8,289,902 B2* | 10/2012 | Fein et al. | 370/328 |
| 8,462,709 B2* | 6/2013 | Nanda et al. | 370/329 |
| 8,571,591 B2* | 10/2013 | Liu et al. | 455/515 |
| 8,811,293 B2* | 8/2014 | Octaviano et al. | 370/329 |
| 8,811,312 B2* | 8/2014 | Seok | 370/329 |
| 8,923,188 B2* | 12/2014 | Cai et al. | 370/315 |
| 2006/0073827 A1* | 4/2006 | Vaisanen et al. | 455/436 |
| 2007/0002811 A1 | 1/2007 | Faccin et al. | |
| 2007/0248033 A1 | 10/2007 | Bejerano et al. | |
| 2008/0102852 A1 | 5/2008 | Du et al. | |
| 2008/0205358 A1* | 8/2008 | Jokela | 370/338 |
| 2011/0032912 A1* | 2/2011 | Cordeiro et al. | 370/336 |

* cited by examiner

| Element ID | Length | Station Count | Channel Utilization | Available Admission Capacity | Channel Width |
|---|---|---|---|---|---|
| 1 | 1 | 2 | 1 | 2 | 1 |

Octets:

| Element ID | Length | Quiet Count | Quiet Period | Quiet Duration | Quiet Offset |
|---|---|---|---|---|---|
| 1 | 1 | 1 | 1 | 2 | 2 |

Octets:

Fig. 7

| Element ID | Length | Quiet Count | Quiet Period | Quiet Duration | Quiet Offset | Quiet Regulatory Class | Quiet Channel Number | Quiet Access Category (Optional) |
|---|---|---|---|---|---|---|---|---|
| 1 | 1 | 1 | 1 | 2 | 2 | 1 | 1 | 1 |

Octets:

PROCEDURE FOR BASIC SERVICE SET (BSS) LOAD MANAGEMENT IN WLAN SYSTEM

TECHNICAL FIELD

The present invention relates to a wireless local area network (WLAN), and more particularly, to a basic service set (BSS) load management procedure in the WLAN system.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data transfer rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data transfer rate to up to 54 Mbps by using the OFDM technology. Disadvantageously, however, the IEEE 802.11a has a shorter communication distance than the IEEE 802.11b. Similarly to the IEEE 802.11b, the IEEE 802.11g implements the data transfer rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data transfer rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. A very high throughput (VHT) WLAN system is one of IEEE 802.11 WLAN systems which have recently been proposed to support a data processing rate of 1 Gbps or higher. The VHT WLAN system is named arbitrarily. To provide a throughput of 1 Gbps or higher, a feasibility test is currently being conducted for the VHT system using 4?4 MIMO and a channel bandwidth of 80 MHz or higher.

Meanwhile, in order to support an access point (AP) selection algorithm for roaming or the like of a station (STA), the WLAN system provides APs or STAs with basic service set (BSS) load information. The BSS load information includes information indicating the number of STAs associated with a specific BSS or a usage level of a channel, or the like. Upon receiving the BSS load information, the STA can select a relatively less busy BSS or the like by using the BSS load information.

A single channel, that is, a 20 MHz channel is premised in a BSS load management procedure in a currently available WLAN. That is, the existing BSS load management procedure provides load information only for the 20 MHz channel. On the other hand, a WLAN system is recently discussed on the premise of using a 40 MHz channel (in case of IEEE 802.11n) or a channel having a bandwidth above 40 MHz. The existing BSS load management procedure cannot provide STAs with information on a 40 MHz, 60 MHz, or 80 MHz (or higher) channel that can be utilized in a BSS.

DISCLOSURE OF INVENTION

Technical Problem

The present invention provides a basic service set (BSS) load management procedure capable of providing stations (STAs) with load information on all available channels in a wireless local area network (WLAN) system using a plurality of sub-channels.

Solution to Problem

The present invention also provides a quiet interval setup procedure that can be used in a BSS load management procedure in a WLAN system using a plurality of sub-channels.

According to an aspect of the present invention, a procedure for BSS load management in a WLAN system is provided. The WLAN system uses a bonding channel, and an access point (AP) of the WLAN system provides stations (STAs) of the WLAN system with BSS load information regarding a channel having a bandwidth less than or equal to a bandwidth of the bonding channel.

According to another aspect of the present invention, a quiet interval setup procedure of a WLAN system is provided. The WLAN system uses a bonding channel. An access point (AP) of the WLAN system provides a station (STA) of the WLAN system with a beacon frame or a probe response frame, wherein the beacon frame and the probe response frame include a quiet element. The quiet element comprises a quiet count field, a quiet period field, a quiet duration field, and a quiet offset field to specify a quiet interval. The STAs receiving the quiet element apply the quiet interval to each of all channels used by the STAs in the bonding channel.

According to another aspect of the present invention, a quiet interval setup procedure in a WLAN system is provided. The WLAN system uses a bonding channel. An AP of the WLAN system provides a STA of the WLAN system with a beacon frame or a probe response frame, wherein the beacon and the probe response frame includes an extended quiet element. For the purpose of specifying a quiet interval, the extended quiet element comprises a quiet count field, a quiet period field, a quiet duration field, a quiet offset field, a quiet regulatory class field and a quiet channel number field. The quiet regulatory class field and the quiet channel number field specify a channel to which the quiet interval is applied. And the STAs receiving the extended quiet element apply the quiet interval to the channel to which the quiet interval is applied.

Advantageous Effects of Invention

According to an embodiment of the present invention, a basic service set (BSS) load management procedure is provided. Therefore, an access point (AP) can effectively provide stations (STAs) with BSS load information on all available channels including a secondary channel or an extension channel or the like, and the STAs can select a BSS to be associated with the STAs by using the BSS load information. In addition, according to an embodiment of the present invention, a dynamic frequency selection (DFS) mechanism is provided so that an AP can set up a quiet interval even for a secondary channel or an extension channel for the purpose of BSS load management. Therefore, a co-channel operation can be avoided for all available channels with respect to another radar system or the like.

MODE FOR THE INVENTION

Hereinafter, embodiments of the present invention will be described in detail with reference to the accompanying drawings. A basic service set (BSS) load management procedure and a dynamic frequency selection (DFS) procedure for the BSS load management procedure in a very high throughput (VHT) wireless local area network (WLAN) system will be described below for the embodiments of the present invention. However, the embodiments of the present invention described below can also apply to another WLAN system (e.g., institute of electrical and electronics engineers (IEEE) 802.11n) using a plurality of sub-channels or a WLAN system using a broadband frequency channel of 40 MHz or higher which is expected to be developed in the future.

Figure 1:
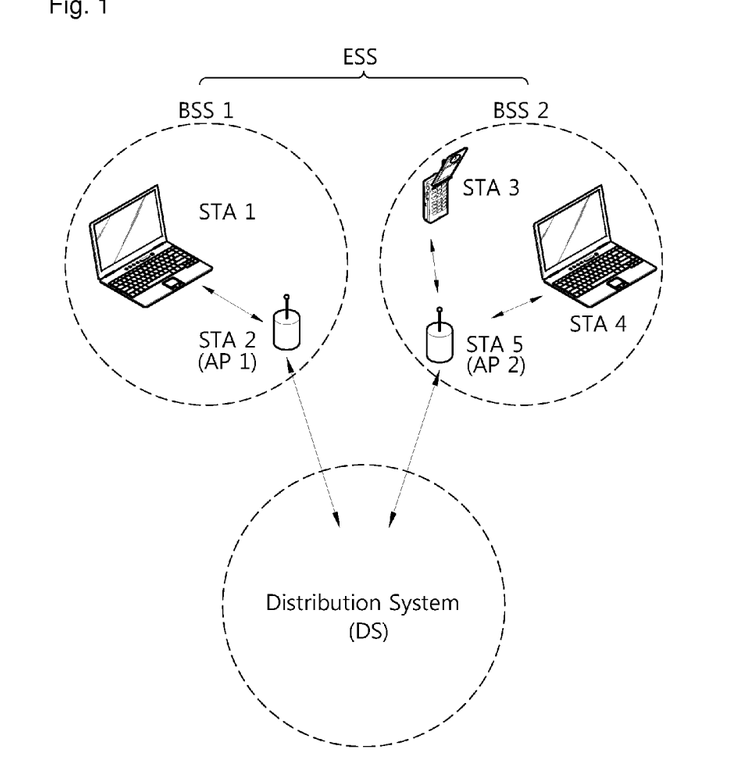
FIG. 1 is a schematic view showing an exemplary structure of a very high throughput (VHT) wireless local area network (WLAN) system according to an embodiment of the present invention.

FIG. 1 is a schematic view showing an exemplary structure of a VHT WLAN system according to an embodiment of the present invention.

Referring to FIG. 1, a WLAN system such as the VHT WLAN system includes one or more basic service sets (BSSs). The BSS is a set of stations (STAs) which are successfully synchronized to communicate with one another, and is not a concept indicating a specific region. As in the WLAN system to which the embodiment of the present invention is applicable, a BSS that supports a super high-rate data processing of 1 GHz or higher in a medium access control (MAC) service access point (SAP) is referred to as a VHT BSS.

The VHT BSS can be classified into an infrastructure BSS and an independent BSS (IBSS). The infrastructure BSS is shown in FIG. 1. Infrastructure BSSs (i.e., BSS1 and BSS2) include one or more non-access point (AP) STAs (i.e., Non-AP STA1, Non-AP STA3, and Non-AP STA4), AP STAs (i.e., AP STA1 and AP STA2) which are STAs providing a distribution service, and a distribution system (DS) connecting the plurality of AP STAs (i.e., AP STA1 and AP STA2). In the infrastructure BSS, an AP STA manages non-AP STAs of the BSS.

On the other hand, the IBSS is a BSS operating in an ad-hoc mode. Since the IBSS does not include the VHT STA, a centralized management entity for performing a management function in a centralized manner does not exist. That is, the IBSS manages the non-AP STAs in a distributed manner. In addition, in the IBSS, all STAs may consist of mobile STAs, and a self-contained network is configured since access to the DS is not allowed.

The STA is an arbitrary functional medium including a medium access control (MAC) and wireless-medium physical layer interface conforming to the IEEE 802.11 standard, and includes both an AP and a non-AP STA in a broad sense. A VHT STA is defined as an STA that supports the super high-rate data processing of 1 GHz or higher in the multi-channel environment to be described below. In the VHT WLAN system to which the embodiment of the present invention is applicable, all STAs included in the BSS may be VHT STAs, or a VHT STA may coexist with a legacy STA (e.g., an IEEE 802.11n-based HT STA).

An STA for wireless communication includes a processor and a transceiver, and also includes a user interface, a display means, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (i.e., STA1, STA3, STA4, and STA5) are portable terminals operated by users. A non-AP STA may be simply referred to as an STA. The non-AP STA may also be referred to as a terminal, a wireless transmit/receive unit (WTRU), a user equipment (UE), a mobile station (MS), a mobile terminal, a mobile subscriber unit, etc. A non-AP VHT-STA (or simply VHT STA) is defined as a non-AP STA that supports the super high-rate data processing of 1 GHz or higher in the multi-channel environment to be described below.

The AP (i.e., AP1 and AP2) is a functional entity for providing access to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super high-rate data processing of 1 GHz or higher in the multi-channel environment to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical construction for interconnecting APs.

Figure 2:
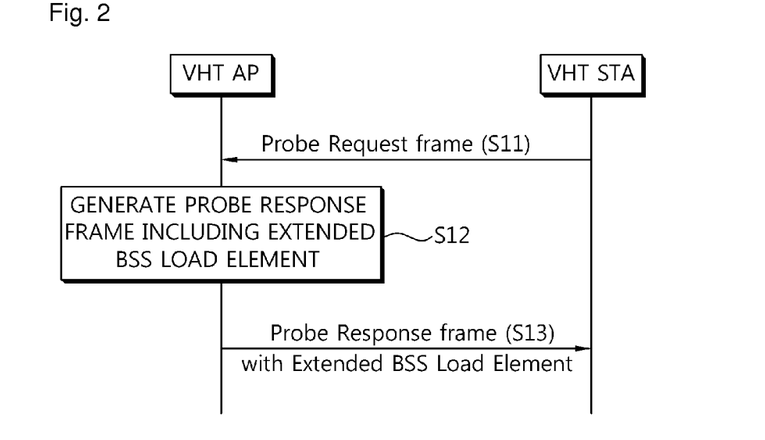
FIG. 2 is a message flow diagram showing an example of a basic service set (BSS) load management procedure in a VHT WLAN system according to an embodiment of the present invention.

FIG. 2 is a message flow diagram showing an example of a BSS load management procedure in a VHT WLAN system according to an embodiment of the present invention. The BSS load management procedure is a procedure in which an AP provides STAs with BSS load information in an infrastructure BSS. An active scan procedure is shown in FIG. 2 as an example of the BSS load management procedure. However, the embodiment of the present invention is not limited thereto, and thus the BSS load management procedure according to the embodiment of the present invention described below can also apply to a passive scan procedure. In case of the passive scan procedure, an extended BSS load element may be periodically provided to the STAs by being included in a beacon frame or the like.

In general, when a UE which is a non-AP STA intends to access to a network in a WLAN system, a scan procedure is first performed to find an AP to which the UE can be associated. The scan procedure is a procedure for obtaining a list of candidate APs to be associated in a subsequent procedure (i.e., an association procedure) and information on each candidate AP. The UE accesses to an IEEE 802.11 WLAN by performing the association procedure and thus becomes a member of an extended service set (ESS).

There are two types of scanning methods. A first method is a passive scan method using a beacon frame which is periodically broadcast from an AP. In the first method, an STA listens a beacon frame to obtain a list of candidate APs transmitting the beacon frame together with a variety of information required for network access by using the candidate APs and/or a variety of service type information or capability information that can be provided by the candidate APs, and channel load information, etc.

A second method is an active scan method. In the second method, an STA intending to be a member of a specific ESS first transmits a probe request frame to an AP. Specific service information requested by the STA transmitting the probe request frame may be specified and included in the probe request frame. Upon receiving the probe request frame, each AP transmits a probe response frame to the STA in response to the received probe request frame. The probe response frame includes a variety of service type information provided by the AP, capability information, and channel load information or the like. Therefore, the STA can obtain a list of APs that can be associated by using the received probe response frame. This will be described below in detail with reference to FIG. 2.

Referring to FIG. 2, a VHT STA transmits a probe request frame to a VHT AP (step S11). The probe request frame may be set to a broadcast destination address or a unicast destination address when transmitted. Information included in the probe request frame includes typical information.

Figure 3:
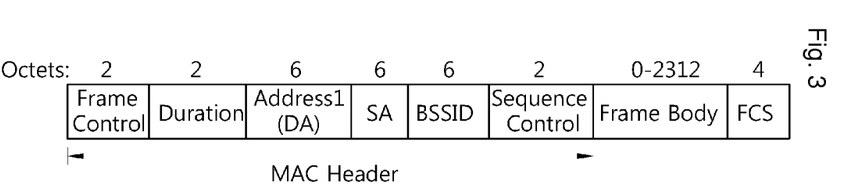
FIG. 3 is a diagram showing an exemplary format of a probe request frame.

FIG. 3 is a diagram showing an exemplary format of a probe request frame. Referring to FIG. 3, the probe request frame includes a medium access control (MAC) header, a frame body, and a frame check sequence (FCS). The MAC header includes a frame control field, a duration field, a destination address (DA) field, a sending address (SA) field, a basis service set identifier (BSSID) field, and a sequence control field.

The frame control field includes a variety of information required in processing of a specific frame. For this, the frame control field may include a protocol version subfield, a type/subtype subfield, a To DS subfield, a From DS subfield, etc. In case of the probe request frame, the type/subtype subfield is set to a value indicating 'probe request'. The duration field includes a duration value designated for the probe request frame. The DA field is set to a destination address of the probe request frame. For example, the DA field may be set to a broadcast address or a MAC address of a specific VHT AP desired by the VHT STA. The SA field is set to a MAC address of an STA for transmitting the probe request frame, that is, a MAC address of the VHT STA. The BSSID field may be set to a specific BSSID desired by the VHT STA or a wildcard BSSID. The sequence control field includes a sequence number subfield for indicating a sequence number of a MAC service data unit (MSDU) or a MAC management protocol data unit (MMPDU) and a fragment number subfield for indicating each fragment number of the MSDU or MMPDU.

There is no particular limitation on information elements that can be included in the frame body of the probe request frame. For example, the body of the probe request frame may include an SSID information element, a supported rate information element, a request information element, an extended supported rate information, etc., and may also include an extended capability information element for configuring information related to an HT or VHT service.

Referring back to FIG. 2, upon receiving the probe request frame, one or more VHT APs generate a probe response frame in response to the probe request frame (step S12). Upon generating the probe response frame, the VHT AP transmits the probe response frame to the VHT STA transmitting the probe request frame (step S13).

A format of the probe response frame generated and transmitted by the VHT AP in the present steps S12 and S13 may be the same as the format of FIG. 3, and all elements included in the existing probe response frame are included in the frame body of the probe response frame. Therefore, detailed descriptions on the existing elements will be omitted. However, the probe response frame generated and transmitted in the present steps is different from the existing probe response frame in a sense that one or more extended BSS load elements are included. The extended BSS load element is for providing BSS load information on channels for bandwidths managed by the VHT AP (e.g., channels having bandwidths of 20 MHz, 40 MHz, 60 MHz, and/or 80 MHz when the VHT WLAN system uses a 80 MHz channel) to the VHT STA.

Figure 4:
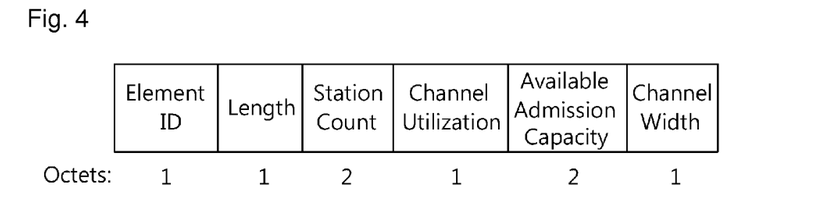
FIG. 4 is a diagram showing a format of an extended BSS load element according to an embodiment of the present invention.

FIG. 4 is a diagram showing a format of an extended BSS load element according to an embodiment of the present invention. Referring to FIG. 4, the extended BSS load element includes an element ID field, a length field, a station count field, a channel utilization field, an available admission capacity field, and a channel width field. The element ID field is set to a specific value indicating the extended BSS load element. The length field may be set to a value indicating a total length of subsequent fields.

The station count field may be set to a value indicating the number of STAs which are associated with the VHT AP at a specific time and which support a channel bandwidth set in the channel bandwidth field. For example, if the subsequent channel bandwidth field is set to a value indicating 80 MHz, the value set in the station count field is set to a value indicating the number of STAs which are associated with the VHT AP at that time and which support a channel bandwidth of 80 MHz.

The channel utilization field may be set to a specific value indicating a channel busy time for using the channel bandwidth set in the channel bandwidth field. That is, the channel utilization field may be set to a percentage of time (e.g., a value normalized by 255) sensed that the medium is busy according to a physical or virtual carrier sense (CS) mechanism. For example, when the subsequent channel bandwidth field is set to a value indicating 80 MHz, the value set in the channel utilization field may be set to a value indicating a time sensed that the channel bandwidth 80 MHz is busy at that time.

The available admission capacity field may be set to a specific value indicating an available medium time for the channel bandwidth set in the channel bandwidth field. That is, the available admission capacity field may be set to a specific value specifying a remaining amount of medium time available via admission control. This value may be helpful for the VHT STA to select a VHT AP which is likely to accept a future admission request, but this does not guarantee acceptance of the admission request. For example, if the subsequent channel bandwidth field is set to a value indicating 80 MHz, the value set in the available admission capacity field may be set to a value indicating a medium time acceptable by the VHT AP when there is the admission request for the channel bandwidth 80 MHz at that time.

The channel width field may be set to a specific value indicating a bandwidth which is used as a unit of channel management in a full channel bandwidth and which is also used as a unit of BSS load management. For example, in a case where the VHT BSS is a system supporting 80 MHz, the channel width field may be set to any one of values 20 MHz, 40 MHz, 60 MHz, and 80 MHz.

As such, upon receiving the probe request frame including the extended BSS load element in step S13, the VHT STA may use information set in the extended BSS load element of the received probe response frame to know information on the number of STAs associated with a channel having a specific bandwidth (i.e., 20 MHz, 40 MHz, 60 MHz, and/or 80 MHz), a medium usage level, an available medium amount, etc. Then, by using such information, the VHT STA can be associated with an optimal VHT AP selected from a plurality of VHT APs.

Meanwhile, the IEEE 802.11n-based WLAN system provides a 40 MHz channel bandwidth. The IEEE 802.11n WLAN system configures a 40 MHz channel by bonding two channels. In this case, two 20 MHz channels constituting the 40 MHz channel are respectively referred to as a primary channel and a secondary channel. The primary channel and the secondary channel have to be idle in order to access to the 40 MHz channel.

According to the conventional BSS load management procedure, channel load information (i.e., a channel busy time or an available medium time or the like) is provided only to the 20 MHz channel. Thus, it is difficult to know load information on a 40 MHz bonding channel when using the conventional BSS load management procedure. However, when using the aforementioned embodiment of the present invention, that is, when the BSS load management procedure according to the aforementioned embodiment of the present invention is applied to an HT WLAN system, an HT AP can provide HT STAs with load information on not only the 20 MHz channel but also the 40 MHz bonding channel. That is, when the BSS load management procedure conforming to the aforementioned embodiment of the present invention is applied to the IEEE 802.11n-based WLAN system, the HT AP may provide HT STAs with BSS load information on the 20 MHz optionally together with the 40 MHz channel by including the BSS load information to a beacon frame or a probe response frame.

Figure 5:
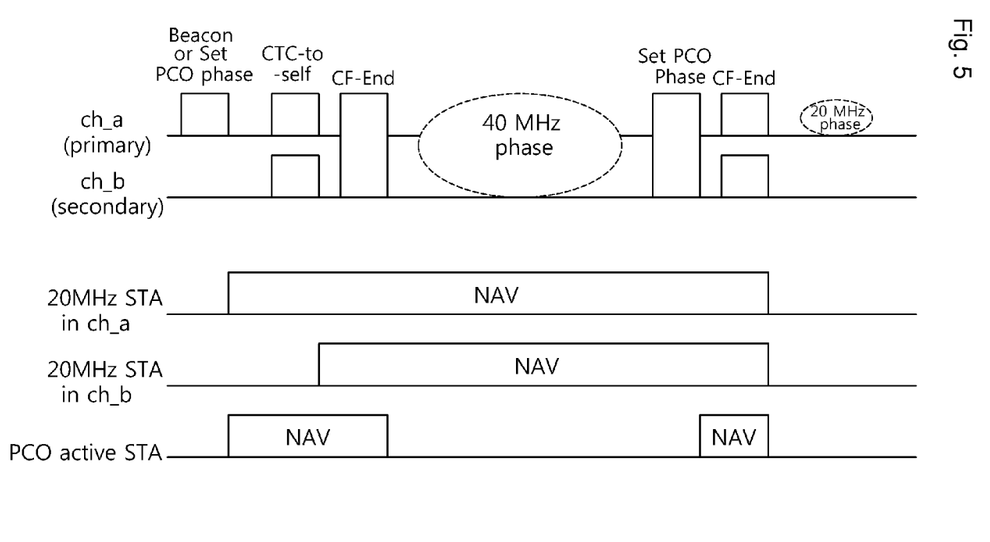
FIG. 5 is a diagram showing an operation of a phase coexistence operation (PCO) according to an embodiment of the present invention.

FIG. 5 is a diagram showing an operation of a phase coexistence operation (PCO) according to an embodiment of the present invention. The PCO is for allowing coexistence of a 20 MHz BSS and a 40 MHz BSS in an HT WLAN system. By using the PCO, an HT AP using a channel of a 20 MHz bandwidth can provide system management so that a channel of a 40 MHz bandwidth is used at a specific time. The PCO operation shown in FIG. 5 is an exemplary PCO operation for a case of using the aforementioned extended BSS load element.

In the IEEE 802.11n-based WLAN system, an HT AP creates a 40 MHz phase for using a 40 MHz channel by the use of a 'beacon or set PCI phase' frame, a clear-to-send (CTS)-to-self frame, and a CF-end frame. As shown in FIG. 5, a 20 MHz channel cannot be used during the 40 MHz phase (that is, a network allocation vector (NAV) is set in a 20 MHz STA operating in a primary channel CH_a and a 20 MHz STA operating in a secondary channel CH_b). However, the 40 MHz channel can be used (that is, an NAV of a PCO active STA is not set in the 40 MHz phase).

In this case, when the conventional BSS load management procedure is directly applied to the HT WLAN system, the HT AP transmits a probe response frame or a beacon frame including a BSS load management element which considers the 40 MHz phase as a channel busy time. On the other hand, as shown in FIG. 5, in case of a channel having a 40 MHz bandwidth, the 40 MHz phase is not a busy time but a time in which channel access is possible according to any typical method. Therefore, the 40 MHz phase needs to be regarded as a channel idle time.

Meanwhile, in order to provide BSS load information on a channel managed by an AP, the AP has to know a medium usage level in a specific channel (e.g., 20 MHz, 40 MHz, 60 MHz, 80 MHz, etc). A level of using a medium by devices (e.g., STA or AP) included in the WLAN system can be recognized to a certain extent according to a carrier sense mechanism or channel information (e.g., information such as a downlink map or an uplink map) managed by the devices. Another wireless communication system (e.g., a radar system or a home network system or the like that admits wireless communication with another home electronic device) may use a radio resource of a specific channel in the same frequency band as the WLAN. From the perspective of the WLAN system, it is preferable to avoid the use of the radio resource.

In order to avoid a co-channel operation with respect to another wireless communication system, the AP managing the BSS needs to sense whether the radio resource is used by another wireless communication system for a specific channel. For example, a radio local area network (RLAN) operating in a 5 GHz band has to implement a mechanism for avoiding the co-channel operation with respect to the radar system. For this, a dynamic frequency selection (DFS) mechanism is used in the WLAN system. According to the DFS mechanism, a specific period is set to prevent STAs against channel access with respect to a channel currently used in the BSS, so as to recognize information on a medium used in this period by another wireless communication system.

Therefore, the DFS mechanism sets up a quiet interval to configure a period for preventing the STAs against channel access, and provides information on the quiet interval to the STAs. This is utilized for radar detection and radio link measurement or the like during a period of the quiet interval, and thus is used to avoid the co-channel operation.

For this, according to the embodiment of the present invention, the AP can set up the quiet interval for a 20 MHz, 40 MHz, 60 MHz, and/or 80 MHz channel. This is because the WLAN system such as the HT WLAN system or the VHT WLAN system to which the embodiment of the present invention is applied can use a 40 MHz channel or a channel having a bandwidth above 40 MHz. In case of the HT WLAN system or the VHT WLAN system, the co-channel operation with respect to the radar system cannot be avoided for all available channels if the quiet interval is simply set up only for the 20 MHz channel. Thus, there is a need to set up the quiet interval for a full channel bandwidth.

Therefore, the method of setting up the quiet interval according to the embodiment of the present invention can set up the quiet interval not only for a primary channel but also for a secondary channel and/or an extension channel. For this, in a method of setting up a quiet interval according to a first embodiment of the present invention, an STA receiving a quiet element not only applies the quiet interval to the primary channel but also applies a quiet interval period specified by the received quiet element to the primary channel, the secondary channel, and/or the extension channel. This method can advantageously simplify a frame format of a quiet element required to apply the quiet interval period to a plurality of channel bandwidths, but disadvantageously cannot use a full channel bandwidth since the same quiet interval is always unnecessarily applied to the full channel bandwidth of 20 MHz, 40 MHz, 60 MHz, and/or 80 MHz.

Figure 6:
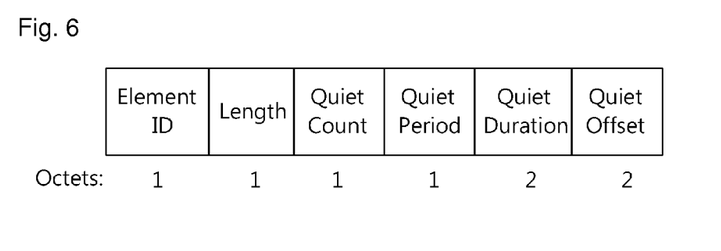
FIG. 6 is a diagram showing a format of a quiet interval element that can be used in a first embodiment of the present invention.

FIG. 6 is a diagram showing a format of a quiet interval element that can be used in a first embodiment of the present invention. Referring to FIG. 6, the quiet interval element includes an element ID field, a length field, a quiet count field, a quiet period field, a quiet duration field, and a quiet offset field. The element ID field is set to a specific value indicating a quiet element. The length field may be set to a value indicating a total length of subsequent fields on an octet basis.

The quiet count field may be set to a value expressed by the number of target beacon transmission times (TBTTs) until a beacon interval at which a next quiet interval starts. When the quiet count field is set to '1', it can indicate that the quiet interval starts during a beacon interval which starts at a next TBTT. The quiet period field may be set to a value indicating the number of beacon intervals between the starts of regularly scheduled quiet intervals defined by this quiet element. When the quiet period field is set to '0', it implies that the period quiet interval is not defined. The quiet duration field may be set to a value indicating a duration of the quiet interval. The quiet offset field may be set to a value indicating an offset between a start time of the quiet interval and a TBTT specified by the quiet count field. The value set in the quiet count field is less than a beacon interval.

Figure 7:
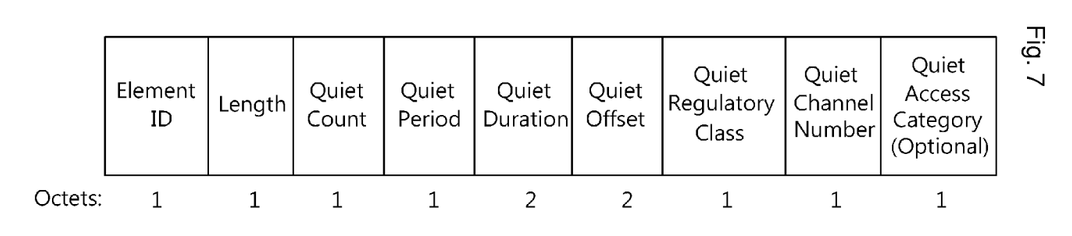
FIG. 7 is a diagram showing a format of an extended quiet interval element that can be used in a second embodiment of the present invention.

In case of an OFDMA-based VHT WLAN system, channel access is achieved on a sub-channel basis. Therefore, in case of the VHT WLAN system, the DFS mechanism may be used on a sub-channel basis to improve usage efficiency of a radio resource. For this, in a method of setting up a quiet interval according to a second embodiment of the present invention, an extended quiet element is included in a beacon frame or a probe response frame or the like which is transmitted for VHT STAs. The extended quiet element is an information element which allows the quiet interval to be applied for each sub-channel.

FIG. 7 is a diagram showing a format of an extended quiet interval element that can be used in a second embodiment of the present invention. Referring to FIG. 7, the extended quiet interval element includes an element ID field, a length field, a quiet count field, a quiet period field, a quiet duration field, a quiet offset field, a quiet regulatory class field, and a quiet channel number field. The extended quiet interval element may further include a quiet access category field as an arbitrary field.

The element ID field is set to a specific value indicating an extended quiet element. The length field may be set to a value in which a total length of subsequent fields is expressed on an octet basis. The quiet count field may be set to a value expressed by the number of TBTTs until a beacon interval at which a next quiet interval starts. The quiet period field may be set to a value indicating the number of beacon intervals between the starts of regularly scheduled quiet intervals defined by this quiet element. The quiet duration field may be set to a value indicating a duration of the quiet interval. The quiet offset field may be set to a value indicating an offset between a start time of the quiet interval and a TBTT specified by the quiet count field.

The extended quiet element includes the quiet regulatory class field and the quiet channel number field, and these fields are for specifying a channel to which the quiet interval is applied. That is, STAs receiving a frame including the extended quiet element do not attempt channel access during the quiet interval only for a channel specified by the quiet regulatory class field and the quiet channel number field.

Although the extended quiet element is an arbitrary field, the quiet access category field may be included therein. The quiet access category field is for specifying an access category (AC) of traffic which is quiet during the quiet interval. Regarding data used, for example, for a bidirectional communication application such as a voice over Internet protocol (VoIP) or the like, real-time transmission is required and, importantly, delay reduction is required. Therefore, if possible, a quiet time is not set up for data or the like in the AC, or it is preferable to minimize a period of the quiet interval. As in the embodiment of the present invention, since the quiet interval can be applied only for a specific AC when an AC field is included in the extended quiet element, continuous channel access can be admitted for an AC used, for example, for the bidirectional communication application. In addition, a channel access period can be separated for real-time traffic (e.g., AC_VO and AC-VI) and non-real time traffic (e.g., AC_BE and AC_BK), and quality of service can be further enhanced for real-time traffic.

The invention claimed is:
1. A method of load management, performed by an access point (AP), in a wireless local area network (WLAN) system, the method comprising:
transmitting first information to a station performing scanning procedure for finding a Basic Service Set (BSS), the first information including a station count field, a first utilization field, and a channel width field; and
transmitting second information to the station, the second information including a second utilization field, wherein the station count field indicates a total number of stations that are currently associated with a BSS of the AP, wherein the first utilization field indicates a utilization of a primary 20 MHz channel that is defined as a fraction of time sensed that the primary 20 MHz channel is busy as indicated by either a physical carrier sense mechanism or a virtual carrier sense mechanism, wherein the channel width field indicates a channel width of an operating channel used for the BSS, wherein, when the channel width field indicates 40 MHz as the channel width of the operating channel, the second utilization field indicates a utilization of a first 20 MHz secondary channel that is defined as a fraction of time sensed that the first 20 MHz secondary channel is busy as indicated by only the physical carrier sense mechanism, and wherein the AP does not access the operating channel if the primary 20 MHz channel is not idle regardless of an idleness of the first 20 MHz secondary channel.

2. The method of claim 1, wherein the first information and the second information are included in a probe response frame transmitted by the AP to the station.

3. The method of claim 1, wherein the first information and the second information are included in a beacon frame broadcasted by the AP.

4. The method of claim 1, wherein, when the channel width field indicates 80 MHz as the channel width of the operating channel, the second information further includes a third utilization field, and wherein the third utilization field indicates a utilization of a second 40 MHz secondary channel that is defined as a fraction of time sensed that the second 40 MHz secondary channel is busy as indicated by only the physical carrier sense mechanism.

5. A wireless apparatus for of load management, the wireless apparatus comprising:

a transceiver; and a processor configured to:

instruct the transceiver to transmit first information to a station performing scanning procedure for finding a Basic Service Set (BSS), the first information including a station count field, a first utilization field, and a channel width field, and instruct the transceiver to transmit second information to the station, the second information including a second utilization field, wherein the station count field indicates a total number of stations that are currently associated with a BSS of an access point (AP), wherein the first utilization field indicates a utilization of a primary 20 MHz channel that is defined as a fraction of time sensed that the primary 20 MHz channel is busy as indicated by either a physical carrier sense mechanism or a virtual carrier sense mechanism, wherein the channel width field indicates a channel width of an operating channel used for the BSS, wherein, when the channel width field indicates 40 MHz as the channel width of the operating channel, the second utilization field indicates a utilization of a first 20 MHz secondary channel that is defined as a fraction of time sensed that the first 20 MHz secondary channel is busy as indicated by only the physical carrier sense mechanism, and wherein the processor is configured not to access the operating channel if the primary 20 MHz channel is not idle regardless of an idleness of the first 20 MHz secondary channel.

6. The wireless apparatus of claim 5, wherein the first information and the second information are included in a probe response frame transmitted by the wireless apparatus to the station.

7. The wireless apparatus of claim 5, wherein the first information and the second information are included in a beacon frame broadcasted by the wireless apparatus.

8. The wireless apparatus of claim 5, wherein, when the channel width field indicates 80 MHz as the channel width of the operating channel, the second information further includes a third utilization field, and wherein the third utilization field indicates a utilization of a second 40 MHz secondary channel that is defined as a fraction of time sensed that the second 40 MHz secondary channel is busy as indicated by only the physical carrier sense mechanism.

9. A method for a wireless local area network, performed by a station, the method comprising:

receiving, from an access point (AP), first information used for AP selection, the first information including a station count field, a first utilization field, and a channel width field; and receiving, from the AP, second information, the second information including a second utilization field, wherein the station count field indicates a total number of stations that are currently associated with a basic service set (BSS) of the AP, wherein the first utilization field indicates a utilization of a primary 20 MHz channel that is defined as a fraction of time sensed that the primary 20 MHz channel is busy as indicated by either a physical carrier sense mechanism or a virtual carrier sense mechanism, wherein the channel width field indicates a channel width of an operating channel used for the BSS, wherein, when the channel width field indicates 40 MHz as the channel width of the operating channel, the second utilization field indicates a utilization of a first 20 MHz secondary channel that is defined as a fraction of time sensed that the first 20 MHz secondary channel is busy as indicated by only the physical carrier sense mechanism, and wherein the station does not access the operating channel if the primary 20 MHz channel is not idle regardless of an idleness of the first 20 MHz secondary channel.

10. The method of claim 9, wherein, when the channel width field indicates 80 MHz as the channel width of the operating channel, the second information further includes a third utilization field, and wherein the third utilization field indicates a utilization of a second 40 MHz secondary channel that is defined as a fraction of time sensed that the second 40 MHz secondary channel is busy as indicated by only the physical carrier sense mechanism.

11. The method of claim 9, wherein the first information and the second information are received in a beacon frame or a probe response frame.

* * * * *